United States Patent [19]

Hoffmann

[11] Patent Number: 4,911,772
[45] Date of Patent: Mar. 27, 1990

[54] METHOD OF APPLYING A THERMOPLASTIC STRIP TO A CONTAINER

[75] Inventor: Wolfgang W. Hoffmann, Modesto, Calif.

[73] Assignee: Shibuya America Corporation, Modesto, Calif.

[21] Appl. No.: 363,055

[22] Filed: Jun. 6, 1989

[51] Int. Cl.⁴ .............................................. B32B 31/26
[52] U.S. Cl. ........................................ 156/86; 53/442; 215/246; 264/230; 264/342 R
[58] Field of Search ............. 156/86; 264/230, 342 R; 215/246; 206/497, 807; 53/399, 419, 442

[56] References Cited

U.S. PATENT DOCUMENTS

| | | | |
|---|---|---|---|
| 3,984,005 | 10/1976 | Amberg | 215/246 |
| 4,028,459 | 6/1977 | Lajovic | 264/230 |
| 4,144,631 | 3/1979 | Fujio | 156/86 |
| 4,293,364 | 10/1981 | Fujio | 156/86 |
| 4,566,923 | 1/1986 | Mueller | 156/86 |
| 4,691,835 | 9/1987 | Mueller | 215/246 |

*Primary Examiner*—Caleb Weston
*Attorney, Agent, or Firm*—Melvin R. Stidham

[57] ABSTRACT

The method includes the step of providing a cylindrical mandrel with vacuum openings around the circumference thereof and of a diameter substantially equal to the maximum diameter of the container. A thermoplastic strip is then wrapped around both the container and the mandrel, and just that portion of the strip enclosing the container is heat shrunk to follow closely the contour of the container. Then, the mandrel is withdrawn from the thermoplastic sleeve and that portion of the sleeve extending above the container is heat shrunk to engage snugly over the top of the container lid.

3 Claims, 1 Drawing Sheet

METHOD OF APPLYING A THERMOPLASTIC STRIP TO A CONTAINER

BACKGROUND OF THE INVENTION

A thermoplastic strip, such as for a tamper evident seal, is generally applied to a container by gluing the leading edge of the strip to the container, wrapping the strip around the container and then gluing the trailing edge of the strip to the overlapped leading edge.

In the alternative, the strip may be formed into a sleeve by wrapping it around a cylindrical mandrel and then gluing the overlapped edges together to form an oversize sleeve, which is thereafter slipped over the container. In either event, after application to the container, the sleeve is heat shrunk to engage tightly around, and follow the contours of, the container and, when the strip is being applied as a tamper evident seal, to the container cap or lid as well.

OBJECTS OF THE INVENTION

It is an object of this invention to provide a method of forming a tamper evident seal for a container without requiring any gluing.

It is a further object of this invention to provide a thermoplastic coating for a container that can be wrapped directly around the container without first forming it as a sleeve.

Other objects and advantages of this invention will become apparent from the description to follow, particularly when read in conjunction with the accompanying drawing.

SUMMARY OF THE INVENTION

In accordance with the method of this invention, a vacuum mandrel is provided of a diameter substantially equal to the maximum diameter of the covered container. Then, a thermoplastic strip is severed into lengths and each length is wrapped around both the container and the axially aligned mandrel, which is pressing down against it. Vacuum passageways open on and around the surface of the mandrel to hold the strip in place as it is being wrapped. Then, the lower portion of the strip below the mandrel, i.e. that portion engaging around the container, is heat shrunk to fit snugly around the lid and at least a portion of the container below it. The mandrel is then withdrawn from the unglued sleeve, and the upper portion of the sleeve is heat shrunk to fit snugly over the top of the lid.

DESCRIPTION OF A PREFERRED EMBODIMENT

Figure 1:
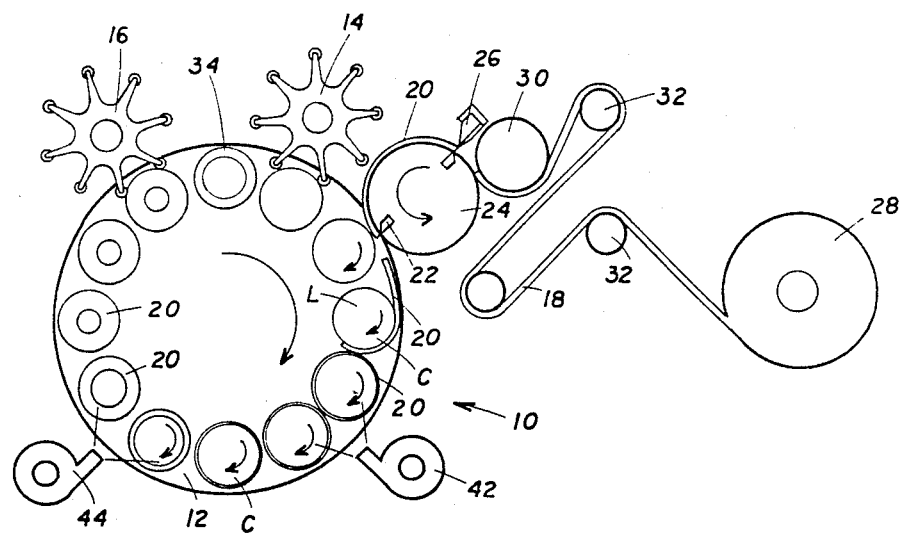
FIG. 1 is a schematic plan view of a machine for applying thermoplastic strips to containers.
Figures 2, 3, 4, 5, 6:
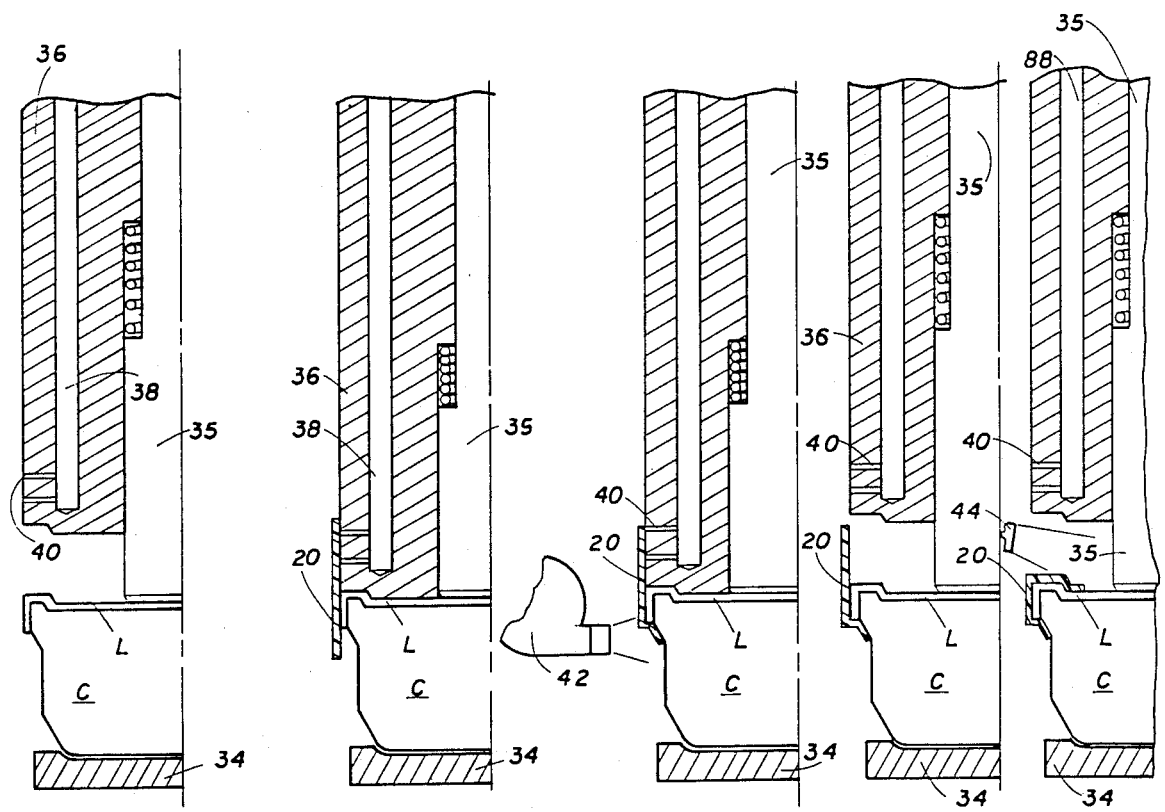
FIGS. 2, 3, 4, 5 and 6 are section views showing sequential steps of applying a strip to a container.

Referring particularly to FIG. 1, the label applying or plastic wrap machine 10 of this invention includes a carousel 12 that rotates in a clockwise direction in FIG. 1 to carry containers C while rotating them about their own axes. The containers are delivered to the carousel by suitable means, such as a star wheel 14, and after wrapping, as will be described, are removed, as by an exit star wheel 16. A plain or labeled strip 18 of heat shrinkable, thermoplastic material is severed into suitable lengths 20 by cutting knives 22 carried on a vacuum drum 24 as each knife passes a stationary knife 26. The vacuum drum then deposits each severed length 20 onto the side of a container C in a manner to be described.

The heat shrinkable, thermoplastic material is supplied from a large cylindrical roll 28 and is fed by a feed roller 30 over guide rolls 32 to be deposited on the surface of the vacuum drum 24.

The pedestal or chuck 34 on which each container C is carried around the carousel is rotated thereon so that the container C may be rotated about its own axis to wrap the label around itself at a rapid rate.

Referring now to FIGS. 2 to 6 in sequence, the container C may be in the nature of a bowl with a lid L in place for a prepared food or spread, such as a cheese spread, margarine, a jam or the like. After the container C is placed on the rotatable chuck 34, a central mandrel core 35, which is rotated on the carousel 12 by any suitable means, is lowered to press against the lid L. Thereafter, a vertical, cylindrical, vacuum sleeve 36 of a diameter substantially equal to the maximum diameter of the container C is lowered to form a continuation of the largest diameter of the covered container. Vacuum passageways 38 in the cylindrical mandrel open at 40 on the surface of the mandrel near the lower end thereof to hold the strip 20 of heat shrinkable material (FIG. 3) as it is deposited by the cutting drum 24 (FIG. 1) and wrapped around the mandrel. After the shrinkable sheet is in place, the rotating container C passes a first, lower heat source or blower 42, which directs a stream of hot air against the lower portion of the strip 20 to heat shrink it tightly against the reduced diameter portion of the container C below the lid L to hold the strip in place.

With the strip 20 held tightly around the container, the cylindrical vacuum sleeve 36 may then be raised to withdraw it from the label or strip 20 that encircles the container C.

Thereafter, the carousel carries the container around to the second, upper heater or blower 44, and as the mandrel core 35 and the chuck 34 continue to rotate the container, the heater directs a stream of hot air against the upper portion of the strip, causing it to shrink and tightly embrace and overlay the outer pheriphery of the lid L.

After the strip or label 20 is placed on the container C it will be held in place, first by the vacuum exposed around the circumference of the mandrel and, second, by the snug engagement of the shrunken lower portion of the label. However, if desired, a spot of glue may be applied to the overlapped leading and trailing edges of the label or strip 20.

While this invention has been described in conjunction with a preferred embodiment thereof, it is obvious that modifications and changes therein may be made by those skilled in the art to which it pertains without departing from the spirit and scope of this invention, as defined by the claims appended hereto.

What is claimed as invention is:

1. The method of applying a tamper-evident strip to a closed container having a top portion with lid of larger diameter than the portion of the container just below said lid forming a peripheral overhang, said method comprising the steps of:

providing a rotatable, vertical vacuum mandrel of substantially the diameter of said lid;

there being a plurality of vacuum passageways opening on the cylindrical surface of said vacuum mandrel adjacent the lower end thereof;

placing said container below said vacuum mandrel in axial alignment therewith;

pressing said vacuum mandrel axially downward against said lid;

wrapping a length of heat shrinkable material around both the lower end of said vacuum mandrel and said top portion with lid, to cling to said vacuum mandrel and extend below said peripheral overhang;

applying heat to the lower portion of said length to shrink said lower portion tightly around said lid and said container at and below said top portion;

withdrawing said vacuum mandrel from within said wrapped length; and applying heat to the upper portion of said length to shrink said upper portion tightly around at least a portion of the top surface of said lid.

2. The method of applying a tamper-evident strip defined by claim 1 including the further steps of:

providing a rotatable base to support said container; and rotating said base, said container and said vacuum mandrel as a unit while wrapping said length of material and applying heat thereto.

3. The method of applying a plastic wrap to a generally cylindrical container comprising the steps of:

providing a rotatable, vertical vacuum mandrel of substantially the maximum diameter of said container;

there being a plurality of vacuum passageways opening on the cylindrical surface of said vacuum mandrel adjacent one end thereof;

placing said container adjacent said vacuum mandrel in axial alignment therewith;

pressing said vacuum mandrel axially against said container;

wrapping a length of heat shrinkable material around both said one end of said vacuum mandrel and the adjacent portion of said container, to cling to said vacuum mandrel while covering at least a portion of said container;

applying heat to the portion of said length covering said container to shrink said portion tightly around said container;

withdrawing said vacuum mandrel from within said wrapped length; and applying heat to the other portion of said length to shrink said other portion tightly around and over said adjacent end of the container.

* * * * *